June 18, 1946. C. A. SIVER 2,402,523
GAS SUPPLY APPARATUS AND CONTROL SYSTEM THEREFOR
Filed April 26, 1940 4 Sheets-Sheet 3

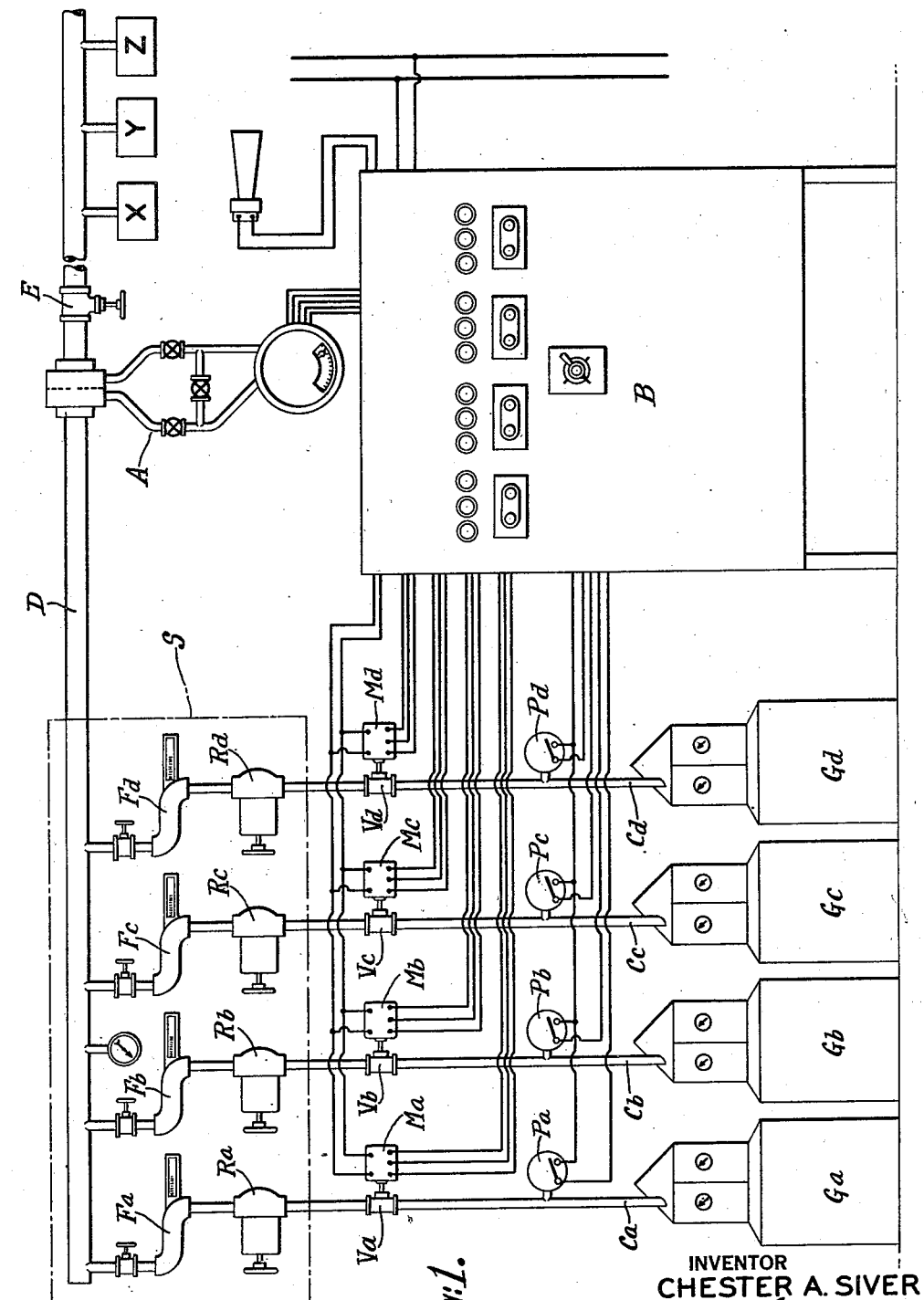

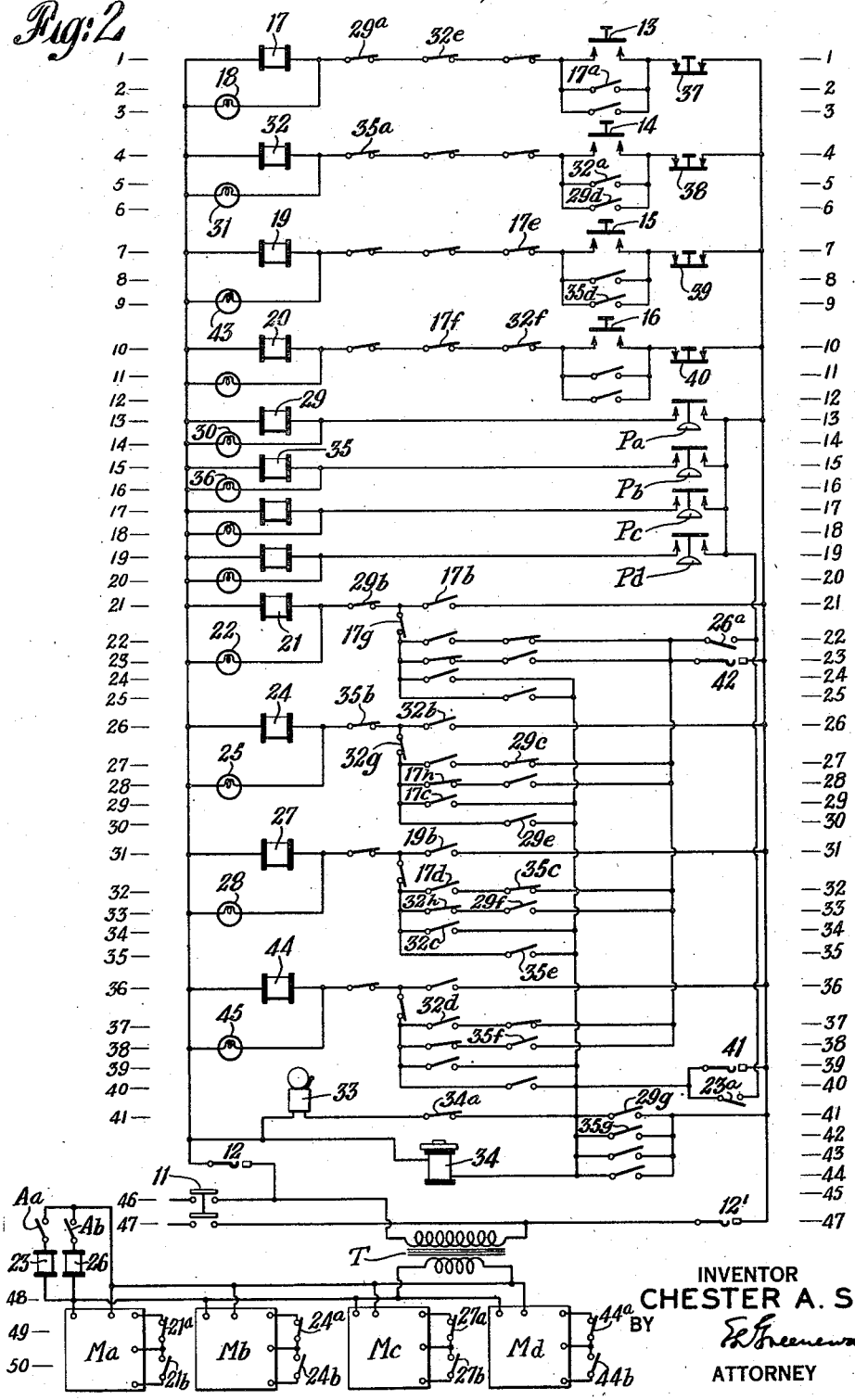

INVENTOR
CHESTER A. SIVER
BY
ATTORNEY

June 18, 1946. C. A. SIVER 2,402,523
GAS SUPPLY APPARATUS AND CONTROL SYSTEM THEREFOR
Filed April 26, 1940 4 Sheets-Sheet 4
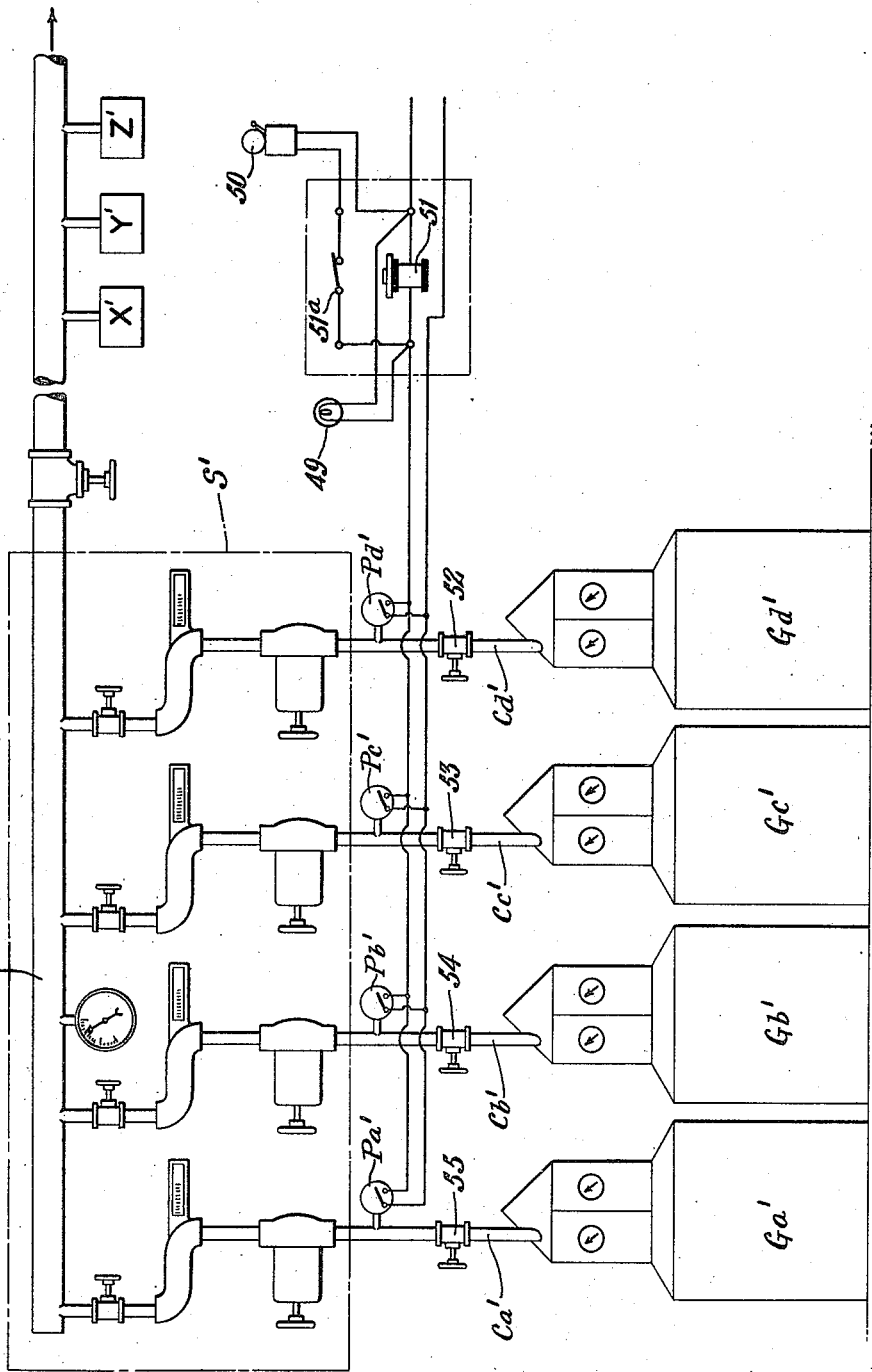
INVENTOR
CHESTER A. SIVER
BY
ATTORNEY

UNITED STATES PATENT OFFICE 2,402,523

GAS SUPPLY APPARATUS AND CONTROL SYSTEM THEREFOR

Chester A. Siver, Indianapolis, Ind., assignor to Union Carbide and Carbon Corporation, a corporation of New York Application April 26, 1940, Serial No. 331,678

17 Claims. (Cl. 48—190)

The invention relates to gas supply apparatus and control systems therefor and, more particularly, to control systems whereby a plurality of gas supply units adapted to supply gas to a common load may operate concurrently without overloading any unit at any time. Moreover, the invention relates to such apparatus and control systems whereby variable quantities of gas may be generated by reacting one substance with one or more other substances, and the gas supplied to a gas-consuming load in accordance with variable demands or load requirements. Additionally, the invention relates to control systems for gas-generating sets comprising a plurality of gas-generator units, for example, medium pressure acetylene generators, the individual units of which are adapted to become operative or inoperative in accordance with predetermined changes in the conditions of gas flow resulting from increased or decreased gas demand to discharge gas to a common delivery conduit, and thence to a load which may comprise one or more gas-consuming units. The invention also contemplates the provision of both apparatus by which a plurality of concurrently operating gas-generator units automatically will share a common load substantially equally, and novel and advantageous methods of controlling gas generation which are made possible by such equalizing apparatus.

For some time there has existed a need for a control system to be used with gas-generating sets, particularly gas-generating sets comprising a plurality of medium pressure acetylene generators adapted to operate concurrently, which will permit their use where service is such that normally they could not be relied upon to supply the demand or load requirements. A continuous, unfailing, and adequate supply of acetylene at constant pressure under widely fluctuating load conditions is required by industries employing the extensively used processes of flame cutting, flame hardening, flame softening, steel deseaming, and steel desurfacing, all of which consume large volumes of acetylene. Especially important in these operations is the fact that at no time must there be any interruption of the acetylene supply. Furthermore, apparatus for performing such operations must be supplied periodically for short intervals with large volumes of gas, after which the load requirement may drop back to a relatively low normal value. Additionally, it is important that any equipment employed in these operations be such that the minimum of attention by an operator is required to achieve its purpose.

Formerly, the only way in which exceptionally large volumes of acetylene gas could be supplied to a load was by the use of a dual installation, in which two banks of generators were operated alternately to supply the load. In such a dual installation, each bank comprises a plurality of generators operating concurrently to supply the load. When one bank is operative to supply the load, the other bank is maintained idle as a reserve bank. When the calcium carbide in the generators of the service bank is exhausted, and the pressure drops, the reserve bank is cut into service and picks up the line load. Such a dual installation is unsatisfactory for supplying a widely fluctuating variable load. Aside from the unsuitability of the dual system for supplying a variable load, it also is disadvantageous for supplying large volumes of gas to a stable load because there is no guarantee of the equality of gas flow from the concurrently operating generator units of the service bank due to their different operating characteristics. Consequently, it frequently happens that one unit runs out of calcium carbide before the other units in the same bank, with the result that either the remaining generator units then must be overloaded to supply the load requirement, or the service bank must be cut out and the reserve bank cut in while some of the units of the service bank still contain substantial quantities of calcium carbide. The present invention not only provides for the supply of large volumes of gas to a variable load, but also provides for the satisfactory supply of large volumes of gas to a stable load without the disadvantages of the dual system as formerly used.

Among the objects of the invention are: to provide apparatus for, and a method of, controlling gas supply apparatus whereby varying quantities of gas may be supplied to a load automatically in accordance with variations in the load requirements; to provide such apparatus and method whereby gas may be supplied to the load continuously and at constant pressure; to provide such apparatus and method whereby individual concurrently operating gas supply units comprising the gas supply apparatus will supply equal portions of the load at all load requirements; to provide apparatus and a method of operating the same whereby a stable load requiring large volumes of gas may be supplied satisfactorily by a plurality of generators operating concurrently in parallel; to provide apparatus and a method of operating the same whereby the operation of each of a plurality of concurrently operating gas supply units within its normal capacity will be assured;

to provide apparatus and a method of operating the same for equalizing the rates of gas flow from a plurality of concurrently operating gas supply units discharging gas to a common gas delivery conduit; and to provide a method of controlling gas generation in a plurality of concurrently operating generator units arranged to supply a common load, whereby the several units will become inoperable successively.

The above and other objects and the novel features of the invention will become apparent from the following description, taken in connection with the accompanying drawings, in which:

Fig. 1 is a schematic diagram of apparatus according to the present invention as applied, by way of example, to four acetylene generators;

Fig. 2 is an electrical diagram showing a part of the automatic control system of the present invention;

Fig. 5 is a schematic diagram showing a typical simple installation of the apparatus of Figs. 3 and 4 as applied to four acetylene generators without automatic control.

Figure 4:
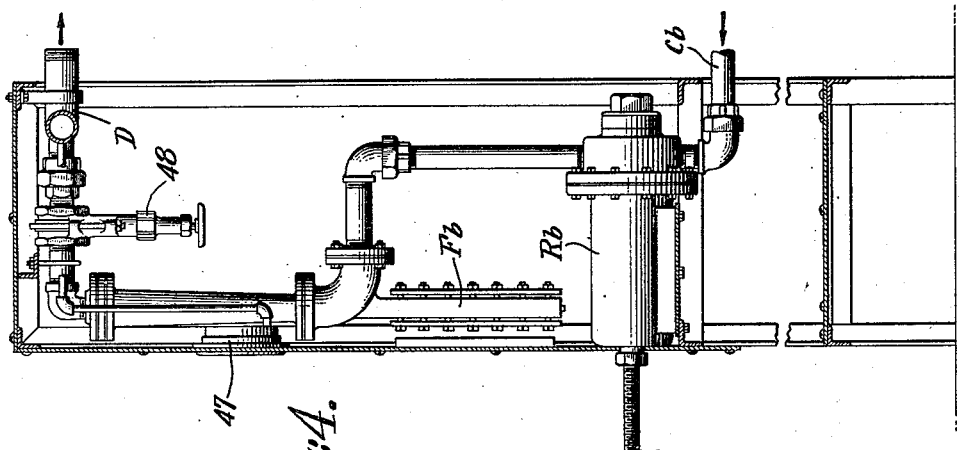
Fig. 4 is a view taken approximately along the line 4—4 of Fig. 3.

As shown in Fig. 1, typical gas supply apparatus to which the principles of the present invention may be applied, comprises four acetylene generator units, Ga, Gb, Gc, and Gd, which are adapted to generate acetylene gas by the well known method of reacting calcium carbide with water. One type of acetylene generator with which the control system of the present invention may be used is described and claimed in Patent No. 2,106,972, issued February 1, 1938, in the name of M. P. DeMotte. In such a generator, the automatic regulation of gas generation ordinarily is accomplished by means of a diaphragm-operated carbide feed-control valve which automatically controls the rate of carbide feed into contact with the water responsively to the gas pressure in the generator. By the present invention the generation and discharge of gas from the generator units, having the aforementioned construction, for example, is started and stopped by suitable mechanism, such as electrically actuated motorized control valves Va, Vb, Vc, and Vd, in the respective discharge ducts Ca, Cb, Cc, and Cd, which, when open, render the corresponding generators operative, and when closed, render the corresponding generators inoperative, to discharge gas to a common delivery conduit or passage D.

Gas generated in each unit passes through the synchronization unit S, comprising pressure regulators Ra, Rb, Rc, and Rd, and flow meters Fa, Fb, Fc, and Fd in the respective discharge ducts, to equalize the rates of gas flow from concurrently operative generators. The gas enters the delivery conduit D where it merges with the gas from the other units, passes through the main flow meter device A connected into the delivery conduit, and then through the service valve E to the load. The load may comprise one or more gas consuming units, shown diagrammatically as X, Y, and Z. For example, the load may comprise a battery of steel desurfacing units or gas-fired furnaces, which individually may require the supply of variable quantities of gas, and which also may require quantities of gas varying in accordance with the number of individual units in operation at one time. The main flow meter A is provided with suitable electrical contacts which are adapted to close successively at predetermined successive increments in the rate of gas flow in the conduit D, and to reopen as the rate of gas flow successively falls below predetermined values.

In the discharge ducts Ca, Cb, Cc, and Cd of the respective generator units are provided pressure switches Pa, Pb, Pc, and Pd, respectively, which are so located as to be subject to the pressure of the gas generated in the several units prior to its entry into the conduit D, and which are adapted to be actuated by the inoperable condition of any inoperable unit in such a way as to close contact when the pressures in the corresponding generator units fall below predetermined minimum values, and to maintain open contact while the pressures are above these minimum values. Both the main flow meter A and the several pressure switches act through the electrical control circuit represented in Fig. 1 by the control board B (to be described more fully hereinafter) to control automatically the operation of the individual generator units so that a continuous, unfailing, and adequate supply of acetylene at constant pressure will be supplied at all times in accordance with the load requirements.

The automatic control system for four acetylene generator units, which is to be described by way of example only, functions in such a way that the following elements of operation will be provided for automatically:

(1) One of the generators will be in continuous operation to supply acetylene demands or load requirements between the rates of zero and a predetermined rate of gas flow, for example, 1000 cu. ft./hr. This is called the prime generator unit.

(2) When the prime generator unit runs out of calcium carbide, or becomes inoperable for any other reason, another generator unit will be placed in continuous operation in its place as the prime unit, and the formerly prime unit will be made inoperative.

(3) When the load requirement increases to above a predetermined rate of gas flow, such as 1000 cu. ft./hr., an auxiliary generator unit will be placed in operation. By means of the synchronization unit, the load then will be divided equally between the two concurrently operative units; for example, each operating generator will supply gas at the rate of substantially 500 cu. ft./hr.

(4) If the load requirement decreases below a predetermined rate of flow, such as 800 cu. ft./hr., the auxiliary unit will be cut out of service, and the prime unit then will operate alone to supply load requirements between zero and the first predetermined increment in the rate of gas flow, for example, 1000 cu. ft./hr.

(5) When the load requirement has exceeded the first predetermined increased rate of gas flow, and two units are in operation concurrently (the prime unit and first auxiliary unit), a second auxiliary unit will be placed in operation if the load requirement exceeds a predetermined second increased rate of gas flow, for example, 2000 cu. ft./hr.; the load then will be divided equally among the three concurrently operative units by means of the synchronization unit.

(6) When the load requirement falls to a predetermined rate of gas flow, such as 1800 cu. ft./hr., the second auxiliary unit will be cut out of service; and when the load requirement drops below another predetermined rate of gas flow, such as 800 cu. ft./hr., the first auxiliary unit will be cut out of service, as in (4) above.

(7) When an auxiliary unit runs out of calcium carbide, or becomes inoperable for any other reason, a substitute auxiliary unit will be rendered operative automatically at that predetermined rate of gas flow which ordinarily would render operative the inoperable auxiliary unit;

(8) Two or more generator units may operate concurrently and continuously to supply acetylene demand rates between zero and a predetermined rate of gas flow, for example, 2000 cu. ft./hr., in order to supply more adequately loads which fluctuate radically between these limits; the load then being divided equally between the two or more concurrently operative generator units by means of the synchronization unit.

(9) Suitable visible and audible signals will be operated to indicate at all times the status of the individual operating units in the generating set.

The control system of the present invention will be described as particularly applied to an acetylene gas generating set comprising four acetylene gas generator units, three of which may operate concurrently to supply the load, and the fourth of which acts as a reserve, which may be kept in readiness to go into operation as soon as one of the other units becomes inoperable. It is to be understood, however, that the principles of the invention may be applied to apparatus for supplying gas other than acetylene, and to such apparatus comprising more or less than four units, as well as to such apparatus in which each unit comprises a plurality of individual gas supply devices.

The electrical diagram of the four generator automatic control system shows, in Fig. 2, the system as completely deenergized, and with the motors Ma, Mb, Mc, and Md of the respective control valves in such a position that all the control valves Va, Vb, Vc, and Vd are closed and all generator units therefore are inoperative. The numbers at the right and left hand edges of the diagram will be used as an index to simplify reference to the various features of the control system.

Assuming that all four generators are charged with calcium carbide and water, and that the gas pressure in each is above a predetermined minimum, the first step in placing the automatic control system in operation is to close the main circuit breaker 11 which energizes the transformer T, and then the selector switch contacts 12 and 12' (lines 43 and 47, respectively). As long as the pressure in all four generators is above a predetermined minimum value, for example 13.5 lb./sq. in., the four pressure switches Pa, Pb, Pc, and Pd, (lines 13, 15, 17, and 19, respectively) will be on open circuit, and energizing the control system by closing the circuit breaker and the selector switches will not place the control mechanism of any unit in operation. To actually start the operation of the gas generating set, one of the selectively operable start switches 13, 14, 15, or 16 in either lines 1, 4, 7, or 10 must be closed manually at the will of the operator, according to which generator is to be placed in operation as the continuously operative prime unit.

Assume that the start switch 13 in line 1 is closed to initiate and maintain operation of unit Ga. The relay 17 in line 1 then is energized, closing the normally-open contacts 17a, 17b, 17c, and 17d in lines 2, 21, 29, and 32, respectively, and opening normally-closed contacts 17e, 17f, 17g, and 17h in lines 7, 10, 21½, and 28, respectively. The white signal light 18 in line 3 is illuminated at the same time, and signifies that unit Ga is the prime continuously operative generator unit. The contact 17a in line 2 serves as an interlock to keep relay 17 energized when the start switch 13 in line 1 returns to its normally-open position. The opening of the contacts 17e and 17f in lines 7 and 10, respectively, prevents relays 19 and 20 from becoming energized while the relay 17 is energized. The closing of the contact 17b in line 21 energizes the motor relay 21 and illuminates the green signal light 22 in line 23. When the motor relay 21 is energized, the contact 21a in line 49 opens and the contact 21b in line 50 closes, thus causing the motor Ma to operate to open the control valve Va in the acetylene discharge duct Ca of unit Ga, which then will start to operate as the prime unit to generate and discharge gas continuously to the delivery conduit D. When the rate of gas flow in the conduit D increases to a predetermined value resulting from an increase in demand or load requirements for gas, for example, 1000 cu. ft./hr., the flow meter actuated control contact Aa in line 47 is actuated from its initial open state and automatically closes, completing the circuit through relay 23, which then closes the switch 23a in line 40 and completes the circuit through the closed contact 17c in line 29 to the motor relay 24 in line 26, and to the green signal light 25 in line 28. The motor relay 24 is then energized, thereby opening the contact 24a in line 49 and closing the contact 24b in line 50, and operating the motor Mb to open automatically the valve Vb in the discharge duct Cb from unit Gb. Unit Gb then becomes operative concurrently with and auxiliary to prime unit Ga to discharge gas to the delivery conduit D where it merges with the gas from unit Ga. By means of the synchronization unit, S shown in Fig. 1, which is to be described more in detail hereinafter in connection with Figs. 3 and 4, the generators Ga and Gb then supply equal portions of the load and neither is overloaded. For example, if the load requirement is 1200 cu. ft./hr., each unit supplies gas at the rate of 600 cu. ft./hr.

If the rate of gas flow in the delivery conduit D reaches a second predetermined value, for example 2000 cu. ft./hr., the flow meter actuated control contact Ab in line 47 is actuated from its initial open state and automatically closes, completing the circuit through the relay 26, which then closes the contact 26a in line 22 and completes the circuit through the contact 17d in line 32 to the motor relay 27 in line 31 and to the green light 28 in line 33. Energizing motor relay 27 opens the contact 27a in line 49 and closes the contact 27b in line 50, thus operating the motor Mc to open automatically the valve Vc in the discharge duct Cc from generator Gc. Unit Gc then becomes operative auxiliary to generators Ga and Gb to discharge gas to the delivery conduit D where it merges with the gas from units Ga and Gb. These three units then will operate concurrently, and will be made to supply equal portions of the load by means of the synchronization unit S.

When the rate of gas flow in the delivery conduit D decreases to a predetermined value, for example 1800 cu. ft./hr., the flow meter contact Ab in line 47 is restored to its initial open state automatically, thus de-energizing the relay 26, opening the contact 26a in line 22, de-energizing the motor relay 27 in line 31, and extinguishing the green signal light 28 in line 33. The contact 27a in line 49 then closes and the contact 27b in line 50 opens, thus operating the motor Mc to close automatically the control valve Vc in the discharge duct Cc from generator Gc, and making unit Gc inoperative.

If the rate of gas flow decreases to a second predetermined value, 800 cu. ft./hr., for example, the flow meter contact Aa in line 47 is restored to its initial open state automatically, thus de-energizing the relay 23, opening the contact 23a in line 40, turning off the green light 25 in line 28, and de-energizing the motor relay 24 in line 26. The contact 24a in line 49 then closes, and the contact 24b in line 50 opens, thus causing the motor Mb to close automatically the control valve Vb in the discharge duct Cb from the generator Gb, and making unit Gb inoperative.

The gas pressure in prime generator unit Ga will decrease when the unit becomes inoperative for any reason, such as exhaustion of the calcium carbide supply. When the pressure has fallen to a predetermined minimum value, for example, 12 lb./sq. in., the pressure switch Pa in line 13 will close automatically, energizing the relay 29 in line 13 and illuminating the red signal light 30 in line 14 to denote that the pressure in Ga is at or below the minimum value. When the relay 29 is energized, normally-closed contacts 29a, 29b, and 29c in lines 1, 21, and 27, respectively, will open, and the contacts 29d, 29e, and 29g in lines 6, 30, 33, and 41 will close. Opening the contact 29a in line 1 will de-energize the relay 17 and extinguish the white signal light 18 in line 3. Opening the contact 29b in line 21 will de-energize the motor relay 21 and shut off the green signal light 22 in line 23, thus restoring contacts 21a and 21b to their original position, and operating the motor Ma in the reverse direction to close the valve Va. The closing of the contact 29g in line 41 will sound the alarm 33 and energize the time relay 34 in line 44, which, after an adjustable time-delay period, will open the contact 34a in line 41, and shut off the alarm.

The closing of the contact 29d in line 6 will illuminate the white signal light 31 in line 5 and will energize the relay 32, which in turn will close contacts 32a, 32b, 32c, and 32d in lines 5, 26, 34, and 37, respectively, and will open contacts 32e, 32f, 32g, and 32h in lines 1, 10, 26½, and 33, respectively. The green signal light 25 in line 28 and the motor relay 24 in line 26 thus will be energized, making generator Gb the continuously operative prime generator unit and indexing or advancing the order of operation of the auxiliary units Gc and Gd, so that Gc now operates at the first increment and Gd at the second increment in the rate of gas flow in the conduit D. In a similar manner, the units Gc and Gd successively will be rendered continuously operative and prime as the respective preceding units Gb and Gc successively become inoperable and the corresponding pressure switches Pb and Pc, respectively, close.

If the rate of gas flow in the delivery conduit D were great enough to cause both units Ga and Gb to be in operation at the time that unit Ga became inoperable, the action would have been the same as described above, except for the fact that the motor relay 24 already would have been energized, the green signal light 25 in line 28 already would have been on, and unit Gc then would be placed in operation auxiliary to newly prime unit Gb. This latter action would be caused by the closing of the contact 32c in line 34 when the relay 32 is energized, thereby completing the circuit through the flow meter contact 23a in line 40 (now closed) to motor relay 27 in line 31 and the green signal light 28 in line 33.

If, when unit Ga is prime, the auxiliary or supplemental unit Gb runs out of calcium carbide, or becomes inoperable for any other reason, the pressure switch Pb in line 15 will close, energizing the relay 35 and illuminating the red signal light 36 in line 16. Energizing the relay 35 opens the contacts 35a, 35b, and 35c in lines 4, 26, and 32, respectively, and closes the contacts 35d, 35e, 35f, and 35g in lines 9, 35, 38, and 42, respectively. Opening the contact 35b in line 26, turns off the green signal light 25 in line 28 and de-energizes the motor relay 24. This latter action actuates the motor Mb to close the control valve Vb in the discharge duct Cb from generator Gb. Opening the contact 35a in line 4 prevents inoperable generator Gb from later being made the prime generator, as it otherwise would when prime generator Ga becomes inoperable. The closing of the contact 35d in line 9 provides for the energization of the relay 19 when prime unit Ga becomes inoperable and the relay 17 is de-energized, thus causing generator unit Gb to be skipped over and unit Gc to become the prime continuously operative generator. Now, with unit Ga prime and unit Gb inoperable, when the flow meter contact 23a in line 40 closes, the motor relay 27 in line 31 will be energized through the closed contact 35e in line 35 and the green signal light 28 in line 33 will light. Energizing the motor relay 27 will cause the motor operated valve Vc to open, placing the substitute generator Gc in operation supplementary to unit Ga in place of inoperable unit Gb. Similarly, closing of the flow meter contact 26a in line 22 will energize the motor relay 44 in line 36 through the closed contact 35f in line 38 and will illuminate the green light 45 in line 38. Energization of the motor relay 44 will open contact 44a in line 49 and close contact 44b in line 50, thus making unit Gd operative concurrently with prime unit Ga and auxiliary unit Gc. The closing of the contact 35g in line 42 will sound the alarm 33 in line 41 to indicate that unit Gb is inoperable and will energize the timing relay 34 in line 44. After an adjustable period of time, the contact 34a in line 41 will open, stopping the alarm.

If the generator Ga is prime, pushing the stop switches 38, 39, or 40 on lines 4, 7, and 10, respectively, or the start switches 15 or 16 on lines 7 and 10, respectively, causes no action whatsoever in the control system. Pushing the stop switch 37 in line 1, however, turns off the white light 18 in line 3 and de-energizes the relay 17. This latter action turns off the green light 22 in line 23 and de-energizes motor relay 21 in line 21, causing the motor operated valve Va to close, thus making unit Ga inoperative. De-energization of the relay 17 also opens the contacts 17c and 17d in lines 29 and 32 respectively, so that all gas generation and discharge ceases.

Also, if unit Ga is prime, pushing the start switch 14 in line 4 illuminates the white signal light 31 in line 5 and energizes the relay 32, thereby making prime the generator Gb. Energizing the relay 32 causes contact 32e in line 1 to open, de-energizing the relay 17 and turning off the signal light 18 in line 3. Thus, it is possible to make prime any desired unit by pushing the start switch of the generator next in sequence after the unit which is then prime, provided, of course, that none of the pressure switches Pa, Pb, Pc, or Pd is closed.

When closing the circuit breaker 11 (line 46) and selector switches 12 and 12' (lines 44 and 47, respectively) to energize the control system, if the gas pressure is sufficiently low in one of the generator units to cause the corresponding pressure switch to be closed, the next generator unit in sequence thereafter automatically will be made the prime continuously operative generator. For instance, assume that the gas pressure in generator Gb is low for some reason, and the pressure switch Pb in line 15 therefore is closed. As soon as the selector switch contacts 12 and 12' are closed, the relay 35 in line 15 immediately becomes energized, and the red signal light 36 in line 16 is illuminated. Energizing the relay 35 closes contact 35d in line 9, thereby energizing the relay 19 in line 7, and illuminating the white signal light 43 in line 9. As pointed out above, energizing the relay 19 closes the contact 19b in line 31, illuminating the green light 28 in line 33 and energizing the motor relay 27 in line 31. Unit Gc therefore becomes the prime generator.

Sometimes it is desirable to have two or more generators operative continuously and concurrently to discharge acetylene to the delivery conduit D, even though the normal load requirement is within the generating capacity of one generator alone. Such an arrangement is especially desirable for installations supplying equipment which consumes gas at very high rates for very short periods of time. For example, in steel desurfacing the equipment requires large volumes of acetylene for about a minute, then is shut down for a longer period of time. If a control system as described previously were used, wherein only one prime generator is in operation to supply loads up to a first predetermined rate of flow, the prime generator unit frequently might be overloaded before a supplemental generator would be placed in operation. Also, with such a high rate of flow being maintained over a very short period of time, the supplemental generator would no sooner be placed in operation than it would be cut out again because of a drop in the rate of flow below a predetermined value. In order to permit the continuous concurrent operation of more than one generator, therefore, additional control means is provided including manually operable selector switch contacts 41 and 42 in lines 39 and 23, respectively, as a means of shorting out the flow meter contacts 23a in line 40 and 26a in line 22, respectively. When the switch 41 is closed, and switch 42 is open, two generators will be in operation continuously to supply loads between zero and the second predetermined rate of gas flow, for example 2000 cu. ft./hr., independently of the flow meter A. The synchronizing unit S then will divide the load equally between the two operative units. When the load requirement reaches 2000 cu. ft./hr., a third generator will be placed in operation, as outlined previously. Similarly, when both selector switches 41 and 42 are closed, three units will operate continuously independently of the flow meter A and the synchronization unit will divide the load equally among the three units.

It is evident that the control system of the invention functions satisfactorily, no matter which unit is the prime continuously operative unit, when the load is such that a plurality of generator units at times must operate concurrently to supply gas thereto. For example, when generator Gb is prime, the order of operation of supplemental units at successive increments in the load is Gc, Gd; when unit Gc is prime, the order of operation is Gd, Ga; and when unit Gd is prime, the order of operation is Ga, Gb.

The provision of the pressure switches Pa, Pb, Pc, and Pd in the respective discharge ducts of the individual units, and the provision of the control valves Va, Vb, Vc, and Vd in the discharge ducts are of particular importance in providing flexible operation at constant gas pressure in the conduit D, and quick response to changes in the load requirements. For example, when unit Ga is prime, and unit Gb is inoperative by reason of the control valve Vb being closed, the pressure of gas in the generator Gb is maintained at the desired value by the previously mentioned diaphragm-operated carbide feeding control valve. Therefore, when the control valve Vb is opened, supplemental gas from unit Gb is supplied instantly at the proper pressure, without the lag which would result if it were necessary to build the pressure up to the required value. Similarly, placing of the pressure switches in the individual discharge ducts, where they are subject to the pressure of gas prior to the entry of such gas into the conduit D, provides for the instantaneous response of the control system to conditions within the individual generator units. Thus, no lag will be experienced in cutting out of service an inoperable unit and making operative in its place another unit when the gas pressure in the inoperable unit falls below a predetermined value.

As previously mentioned, an important and necessary part of the control system of the invention is apparatus for, and a method of, automatically equalizing the rates of gas flow from the generator units at any total load requirement when more than one of such units are operative concurrently. By equalizing the rates of gas flow, each unit will deliver its proportionate share of any total load requirement, and no generator unit will be overloaded. Furthermore, if the several units originally are charged with equal amounts of calcium carbide, equalization of flow insures a predetermined normal sequence of operation. For example, the most desirable sequence of operation of the units as prime continuously operative units is Ga, Gb, Gc, Gd, and this sequence normally is assured by the equalization of gas flow from concurrently operating units and the resulting equal rate of calcium carbide consumption, which assures exhaustion of the prime generator before any of the additional generators. Without equalization, if unit Ga were prime, and units Gb and Gc were operating concurrently with, and auxiliary to, unit Ga, the share of the load borne by units Gb and Gc could be so disproportionately large that they would run out of calcium carbide before prime unit Ga, thus disrupting the sequence of operation.

If the flow resistances in the discharge ducts from the several units are equal, and if the pressure conditions in the discharge ducts on the discharge sides of the regulators Ra, Rb, Rc, and Rd are equal, the rates of flow from the individual generators will all be equal. If the discharge pressures from the regulators are not equal, that generator for which the discharge pressure is the greatest will supply the largest proportion of the total acetylene load requirement. Variations of pressure as small as 0.1 lb./sq. in. in the several discharge ducts have been found to produce wide differences in the individual rates of gas flow.

Figure 3:
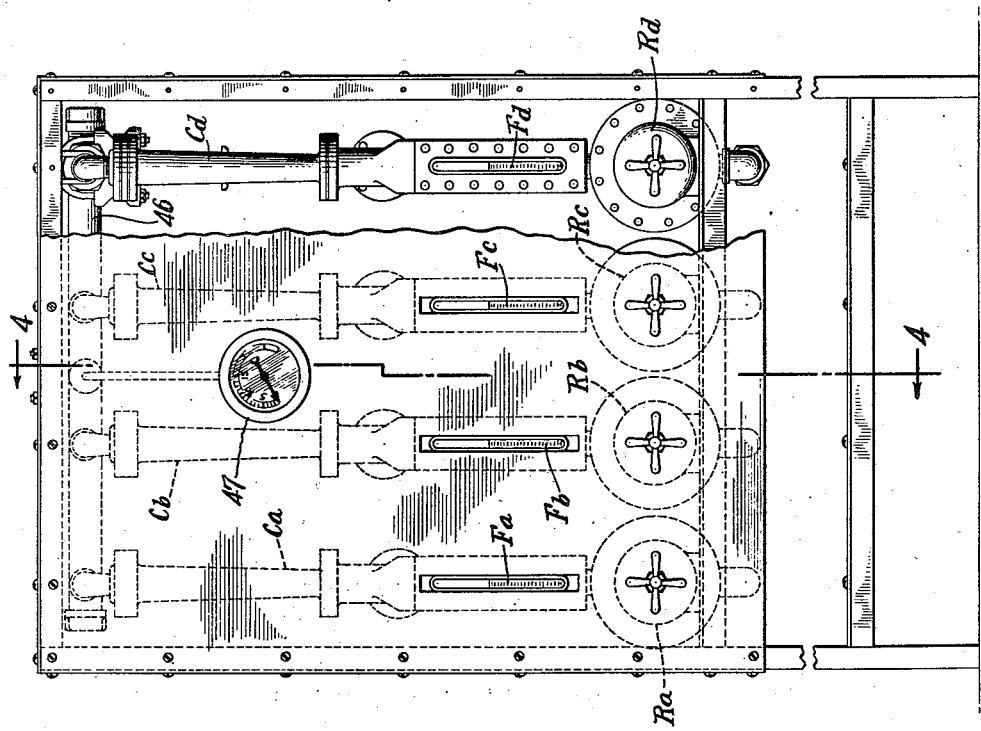
Fig. 3 is a front elevational view, partly broken away, showing the part of the control system for equalizing the rates of gas flow from the concurrently operating gas supply units.

As shown diagrammatically in Fig. 1, and in detail in Figs. 3 and 4, the apparatus for equalizing the rates of gas flow from a plurality of concurrently operative generator units comprises pressure condition responsive automatic flow control regulators Ra, Rb, Rc, and Rd, and flow meters Fa, Fb, Fc, and Fd, respectively, connected in series in the discharge ducts Ca, Cb, Cc, and Cd, respectively, between the several generator units and delivery conduit D. All of the ducts Ca, Cb, Cc, and Cd are of substantially equal size and provide substantially equal resistance to the flow of gas. The pressure regulators preferably are each placed an equal distance from a manifold 46, which comprises a part of the delivery conduit D, so that the same pressure drops will exist between all regulators and the manifold. A pressure gauge 47 is connected into the manifold 46 to indicate the gas delivery pressure therein, and a gate valve 48 is provided in each discharge duct to shut off the corresponding generator from the delivery conduit D, if desired.

In order to obtain equalization of the rates of gas discharge from the several units at all total load requirements, the gas pressure in the manifold 46, as shown by the gauge 47, is first brought up to the desired value by turning the adjusting screws of the regulators. The flow rates are then accurately equalized by adjusting the individual regulator settings independently of the gas discharges from other generators until the discharge pressures, as represented by the flow rates indicated by the respective flow meters, are all equal. After having once been equalized in this manner, the flow rates and pressures of the gas from concurrently operative units will remain mutually equal for all total acetylene load requirements.

For satisfactory equalization of rates of gas flow from concurrently operative generator units over all load requirements, it is imperative to use pressure regulators of the same capacity, thereby providing the same flow resistance, and having substantially constant operating characteristics over a wide range of rates of gas flow. Attempts have been made to utilize for equalization regulators such as are ordinarily used in the discharge ducts of acetylene generators. Although such regulators may be used for a constant rate of flow in the gas delivery conduit, if preadjusted for that particular rate of flow, their operating characteristics are so inconstant that variations in the load requirements produce different rates of gas flow through each regulator, with the result that equalization no longer is obtained. A pressure regulator which has proved suitable for equalization is disclosed in Patent No. 2,318,721, issued May 11, 1943 to C. A. Silver.

Although particularly useful as part of an automatic control system for a plurality of gas supply units, the synchronization apparatus for equalizing rates of gas flow from concurrently operating units also makes possible another valuable and novel method of generating gas and supplying the gas to a load. Although this novel method of controlling gas, called stepped operation, is applicable to fluid-flow arrangements generally, as well as to the generation of any kind of gas by reacting one substance with one or more other substances, it will be described in connection with Fig. 5 of the drawings showing, by way of example, a plurality of acetylene generators.

Fig. 5 shows an acetylene gas generating set similar to that of Fig. 1, but without an automatic control system. Four acetylene generator units Ga', Gb', Gc', and Gd' are arranged to discharge gas through the respective discharge ducts Ca', Cb', Cc', and Cd', and a synchronization unit S', such as previously described in detail, to a delivery conduit D', and thence to a load shown as X', Y', and Z'. Pressure switches Pa', Pb', Pc', and Pd' in the respective discharge ducts are normally open, but are adapted to close when the gas pressure in the respective units falls below a predetermined value, thereby energizing suitable signals. Thus, when any pressure switch closes, the signal light 49 is illuminated, the alarm 50 sounds, and the time relay 51 is energized. After an adjustable time delay period, the relay 51 opens the contact 51a and shuts off the alarm.

In stepped operation, with a gas generating set as shown in Fig. 5, each of a plurality of acetylene generators is charged with a different quantity of calcium carbide and with sufficient water to react with all of the calcium carbide charge, so that the maximum quantity of gas which may be generated in each unit is different from the quantity which may be generated in each other unit. The charges of calcium carbide and water then are reacted concurrently in each unit and the several units operate concurrently to discharge gas into the common delivery conduit. As the rates of gas discharge from the several units are equalized by the synchronization unit S', the charges of calcium carbide in each unit are expended at the same rate, with the result that the units become inoperative successively in accordance with the quantity of calcium carbide initially charged. Continuity of operation thereby is insured because each unit may be recharged as soon as it becomes inoperative, while the other units continue to operate with the full load being shared by them equally. By way of example, if the charge of calcium carbide in each of units Ga', Gb', Gc', and Gd', is five pounds greater than the charge of the unit at its left, the calcium carbide charges will become exhausted in the units successively from left to right. In other words, when unit Ga' becomes inoperative, units Gb', Gc', and Gd' will continue to operate while unit Ga' is being recharged with calcium carbide, and a one third share of the load will be carried by each of the three operating units.

Although the principles of the present invention have been described particularly as applied to acetylene gas generating sets comprising four individual generator units, it is evident that the principles may be applied equally well to gas supply apparatus for gases other than acetylene gas, and comprising either more or less than four units. Furthermore, each unit may consist of more than one gas generator without departing from the principles of the invention.

What is claimed is:

1. A control system for maintaining an adequate flow of gas from a plurality of gas supply units through a single gas delivery conduit communicating with all of said units to gas consuming means having variable gas requirements, such control system comprising control means so constructed and arranged as to initiate and maintain operation of one of said units to discharge gas into said conduit; means responsive to the gas flow in said conduit so constructed and arranged as to operate at a predetermined change in a condition of the gas flow resulting from an increase in the gas requirements of said gas consuming means to render an additional unit operative concurrently with said one unit to discharge gas to said conduit; and flow control means between said units and said conduit so constructed and arranged as to operate automatically in response to a condition of gas flow to equalize the rates and pressures of gas discharge from concurrently operative units.

2. In a control system for gas generating apparatus comprising a plurality of generator units arranged to discharge gas to a common gas delivery conduit; control means so constructed and arranged as to initiate and maintain operation of one of said units, said one unit thereby becoming continuously operative and prime; means responsive to rate of gas flow in such delivery conduit so constructed and arranged as to render operative successively and in sequence auxiliary units at successive predetermined increased rates of gas flow to operate concurrently with said prime unit, and to render inoperative and in reverse sequence said operative auxiliary units as the rate of gas flow falls successively below predetermined values; and flow control means between said units and said conduit so constructed and arranged as to operate automatically in response to a condition of gas flow to equalize the rates and pressures of gas flow from concurrently operative units, whereby substantially equal shares of the load are carried by all operative units.

3. In a control system for gas generating apparatus comprising a plurality of generator units arranged to discharge gas to a common gas delivery conduit; control means so constructed and arranged as to initiate and maintain operation of one of said units, said one unit thereby becoming continuously operative and prime; means responsive to gas flow in such delivery conduit so constructed and arranged as to operate at predetermined successive changes in a condition of gas flow resulting from an increased demand for gas to render operative successively and in sequence auxiliary units to operate concurrently with said prime unit, and to render inoperative and in reverse sequence said operative auxiliary units at other predetermined successive changes in said condition resulting from a decreased demand for gas; flow control means between said units and said conduit so constructed and arranged as to operate automatically in response to a condition of gas flow to equalize the rates and pressures of gas flow from concurrently operative units, whereby substantially equal shares of the load are carried by all operative units; and manually operable additional control means associated with said gas flow responsive means so constructed and arranged as to render at least one of said auxiliary units continuously operative with said prime unit independently of such flow responsive means.

4. In a control system for gas generating apparatus comprising a plurality of generator units arranged to discharge gas to a common delivery conduit; control means constructed and arranged for initiating and maintaining operation of a unit, thereby rendering said unit continuously operative and prime to discharge gas to such delivery conduit; means responsive to a condition of the gas flow in such delivery conduit so constructed and arranged as to render operative successively and in sequence auxiliary units at successive predetermined changes in such condition of gas flow resulting from increased demand for gas; means constructed and arranged for rendering operative a substitute unit in place of any inoperable unit, said last-named means being actuated by the inoperative condition of said inoperable unit; and means responsive to a condition of gas flow so constructed and arranged as to equalize the pressures and rates of gas discharge from concurrently operating units.

5. A control system for gas generating apparatus including at least three generator units arranged to discharge gas to a common delivery conduit, said control system comprising control means constructed and arranged for initiating and maintaining operation of one unit, thereby rendering said unit continuously operative as the prime unit to discharge gas to such delivery conduit; means responsive to gas flow in such delivery conduit so constructed and arranged as to render operative a second unit upon a predetermined change in the conditions of gas flow resulting from an increased demand for gas; means constructed and arranged for equalizing the pressures and rates of gas discharge from concurrently operative units whereby an equal share of the load is carried by each operative unit, said last-named means being responsive to gas flow; and means operable in response to a predetermined condition of the operation of said prime unit so constructed and arranged as to cut said prime unit out of service, and to render operative continuously as the prime unit said second unit, said last-named means acting to render a third unit operative thereafter upon such predetermined change in the conditions of gas flow.

6. A control system for gas generating apparatus comprising a gas delivery conduit, a plurality of gas generator units constructed and arranged to discharge gas to said delivery conduit, and a discharge duct connecting each unit to said delivery conduit, said control system including: control mechanisms severally operatively associated with said units; means constructed and arranged for actuating one of said control mechanisms whereby the unit associated therewith becomes continuously operative as the prime unit; means responsive to a condition of the gas flow in said delivery conduit so constructed and arranged as to actuate successively and in sequence the control mechanisms of auxiliary units at predetermined successive changes in said condition resulting from an increased demand for gas; means for equalizing the rates of gas discharge from concurrently operative units whereby an equal share of the load is carried by each operative unit; means responsive to the gas pressure in said prime unit so constructed and arranged as to operate at a predetermined minimum pressure therein to cut out of service said prime unit, and to render continuously operative as the prime unit the auxiliary unit next in sequence thereto, said last-named means also being constructed and arranged to advance the order of operation of the other auxiliary unit or units at said successive increased rates of gas flow; pressure responsive devices severally responsive to the gas pressures in said auxiliary units and actuatable at a predetermined minimum pressure of the gas discharge therefrom;

and means cooperating with said pressure responsive devices, when any unit becomes inoperable and the pressure of the gas discharge therefrom falls below said predetermined minimum, so constructed and arranged as to actuate the control mechanism of a substitute auxiliary unit whereby said substitute unit becomes operative in place of said inoperable unit.

7. A control system for gas generating apparatus comprising a plurality of generator units, a single gas delivery conduit, and separate ducts leading from said generator units to said delivery conduit, such control system being operative for maintaining an adequate flow of gas from said units through said conduit to gas consuming means having variable gas requirements, such control system comprising control means so constructed and arranged as to initiate and maintain operation of at least one of said units, said one unit thereby becoming continuously operative and prime, to discharge gas into said conduit; means responsive to a condition of gas flow in said conduit so constructed and arranged as to render one or more auxiliary units operative successively upon successive changes in such condition resulting from increased requirements for gas, to discharge gas to said conduit concurrently with said prime unit; and pressure responsive means associated with said prime unit and so located as to be subjected to the pressure of the gas generated in said prime unit prior to entry of such gas into said conduit, said pressure responsive means being so constructed and arranged as to be actuated at a predetermined minimum pressure to cut out of service said prime unit, and to render continuously operative and prime the operable auxiliary unit next in sequence thereafter, said pressure responsive means also being constructed and arranged to advance the order of operation of auxiliary units at said successive changes in said condition of gas flow.

8. A control system according to claim 7, wherein said pressure responsive means associated with said prime unit comprises a pressure switch in the duct leading from said prime unit, and relay means controlled by said pressure switch.

9. A control system for gas generating apparatus including at least two generator units individually adapted to generate gas and discharge such gas into a common delivery conduit, such control system comprising: individual electrically actuated devices severally controlling the starting and stopping of gas generation in said units; electrically operable relays severally controlling said devices; selectively operable switch means controlling the circuits of said relays and operable manually to actuate at will any selected relay whereby to initiate and maintain operation of the unit controlled thereby, to render said unit continuously operative as the prime unit; and means responsive to the gas flow in said delivery conduit so constructed and arranged as to actuate a second one of said relays at a predetermined change in a condition of gas flow in said conduit resulting from an increased demand for gas, to render operative a second unit to generate gas and discharge such gas to said conduit concurrently with said prime unit, said last-named means also being so constructed and arranged as to actuate said second relay thereafter at a second predetermined change in a condition of gas flow in said conduit resulting from a decreased demand for gas, to render said second unit inoperative again.

10. A control system for gas generating apparatus including first, second, and third generator units individually adapted to generate gas and discharge such gas into a common delivery conduit, said control system comprising first, second, and third electrically actuated devices respectively controlling the starting and stopping of gas generation in said units; first control means so constructed and arranged as to actuate said first device, thereby initiating and maintaining operation of said first unit; second and third control means controlling the electrical circuits of said second and third devices, respectively; means responsive to the gas flow in said delivery conduit so constructed and arranged as to actuate said second and third control means automatically and successively from their initial states at successive predetermined changes in a condition of gas flow resulting from an increased demand for gas to render said second and third units successively operative to generate gas and supply such gas to said conduit concurrently with said first unit, said gas flow responsive means thereafter acting to restore said third and second control means successively to their initial states and render said third and second units inoperative at successive predetermined changes in said condition of gas flow resulting from a decreased demand for gas; and additional control means manually operable to place the circuit of said second device in condition to actuate said second device independently of such gas flow to render said second unit continuously operative with said first unit.

11. A control system for gas generating apparatus comprising at least two acetylene gas generator units, a single delivery conduit, and individual gas discharge ducts leading from said generators into said delivery conduit, said control system comprising normally closed valves in said ducts; means constructed and arranged for opening one of said valves and rendering operative a first unit to generate and discharge acetylene to said delivery conduit, supplying a demand for acetylene within the capacity of said first unit; and means including a device connected into the single delivery conduit and responsive to the gas flow therein so constructed and arranged as to operate at a predetermined change in a condition of gas flow resulting from an increased demand for gas to open automatically a second valve and render operative a second one of said units to generate and discharge acetylene gas to said delivery conduit concurrently with said first unit, said last-named means also being so constructed and arranged as to operate at a predetermined change in said condition of gas flow in said delivery conduit resulting from a decreased demand for gas thereafter to close automatically said second valve and render said second unit inoperative again.

12. A control system for a plurality of gas generating units, said system being so constructed and arranged as to maintain a flow of gas from said units through a single delivery conduit to satisfy a variable demand, said system comprising control means constructed and arranged for initiating and maintaining operation of at least one of said units, said unit being rendered continuously operative and prime to discharge gas into said conduit; means responsive to a condition of gas flow in said conduit so constructed and arranged as to operate at a predetermined change in said condition resulting from an increased demand for gas to render at least one auxiliary unit operative to discharge gas into said conduit concurrently with said prime unit; a plurality of pressure responsive devices severally associated with said units and so constructed and arranged as to be actuated at a predetermined minimum pressure of gas within said units to cut an inoperable unit out of service, and substantially simultaneously to substitute a similar unit in service by rendering operative the operable auxiliary unit next in sequence thereafter; and indicators so constructed and arranged as to denote which of said units is continuously operating as a prime unit and which of said units is operating as an auxiliary unit.

13. A control system as claimed in claim 12, including additional indicators operable by said pressure-responsive devices and so constructed and arranged as to denote in which of said units the gas pressure is at or below said predetermined minimum pressure.

14. A control system for maintaining an adequate flow of gas from gas generating apparatus comprising a plurality of generator units and a single gas delivery conduit communicating with all of said units, to gas consuming means having variable gas requirements, such control system comprising control means so constructed and arranged as to initiate and maintain operation of at least one of said units, rendering said unit continuously operative and prime to discharge gas into said conduit; means responsive to the gas flow in said conduit, and actuatable at a predetermined change in a condition of gas flow therein resulting from increased demand for gas, so constructed and arranged as to render an auxiliary unit operative to discharge gas into said conduit concurrently with said prime unit; and a plurality of individual gas pressure responsive devices severally associated with said generator units and so constructed and arranged as to be subject to the pressure of gas prior to entry of such gas into said conduit, said pressure responsive devices being also so constructed and arranged as to operate at predetermined minimum gas pressures in said units to cut out of service any inoperable generator unit and to cut into operation in its place a substitute generator unit.

15. In combination, a plurality of acetylene generators of the type wherein the regulated generation of acetylene is accomplished by automatically controlling the contacting of calcium carbide with water responsively to the acetylene pressure in said generators, said generators being so constructed that they may have different operating characteristics such that their acetylene discharge rates may vary during normal operation; a gas delivery conduit to supply a fluctuating demand for acetylene; a plurality of gas discharge ducts, each connecting one of said generators to said delivery conduit; flow meters severally arranged in said discharge ducts; and pressure-actuated pressure regulators of substantially equal capacity severally controlling said discharge ducts and adjustable to discharge acetylene to said delivery conduit at equal pressures and equal rates of flow as indicated by said flowmeters, whereby all concurrently operating generators supply gas to said delivery conduit at an equal rate of flow.

16. Method of controlling the generation of gas by reacting one substance with at least one other substance, which comprises charging said substances into each of a plurality of gas generator units in such quantities that the maximum quantity of gas which may be generated in each unit before the charge of at least one of said substances becomes exhausted is substantially different from the maximum quantity of gas which may be generated in any other of such units, whereby said substances will concurrently react in such units to generate gas therein; concurrently discharging the gas generated in such units to a single delivery conduit; and equalizing the rates of gas discharge from such units, thereby causing such units to become inoperable successively in accordance with the maximum quantities of gas which may be generated therein.

17. Method of controlling the generation of acetylene by reacting calcium carbide with water, which comprises charging substantially different quantities of calcium carbide into each of a plurality of acetylene generator units; charging water into all of said units in sufficient quantity to react with all of the calcium carbide therein whereby said calcium carbide and said water will concurrently react in said units to generate acetylene therein; concurrently discharging the acetylene from said units to a single delivery conduit; and equalizing the rates of gas discharge from said units, thereby causing said units to become inoperable successively in accordance with the quantities of calcium carbide initially contained therein.

CHESTER A. SIVER.